(12) United States Patent
Kempema et al.

(10) Patent No.: US 12,129,783 B2
(45) Date of Patent: Oct. 29, 2024

(54) SYSTEM AND METHODS FOR ESTIMATING EMISSIONS

(71) Applicant: Ford Global Technologies, LLC, Dearborn, MI (US)

(72) Inventors: Nathan Kempema, Grosse Pointe Farms, MI (US); Conner Sharpe, Mountain View, CA (US); David John Kubinski, Canton, MI (US); Xiao Wu, Troy, MI (US); Mehrdad Shahabi, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 17/656,585

(22) Filed: Mar. 25, 2022

(65) Prior Publication Data
US 2023/0304430 A1   Sep. 28, 2023

(51) Int. Cl.
*F01N 3/00* (2006.01)
*F01N 3/08* (2006.01)
*F01N 3/20* (2006.01)
*G06F 18/214* (2023.01)
*G06N 20/00* (2019.01)

(52) U.S. Cl.
CPC ......... *F01N 3/2073* (2013.01); *F01N 3/0814* (2013.01); *F01N 3/206* (2013.01); *G06F 18/214* (2023.01); *G06N 20/00* (2019.01)

(58) Field of Classification Search
CPC ...... F01N 3/2073; F01N 3/0814; F01N 3/206; F01N 2430/06; F01N 11/007; F01N 2550/02; F01N 2560/021; F01N 2560/025; F01N 2570/10; F01N 2570/12; F01N 11/00; F01N 2560/026; F01N 2610/02; F01N 2900/0402; F01N 2900/08; F01N 2900/10; F01N 2900/1402; G06F 18/214; G06N 20/00; G06N 3/08
See application file for complete search history.

(56) References Cited

U.S. PATENT DOCUMENTS 6,623,975 B1   9/2003   Tefft et al.
10,851,725 B2 * 12/2020   Charbonnel ........ F02D 41/1466
(Continued)

FOREIGN PATENT DOCUMENTS

DE   102008057494 A1   7/2009
DE   102015121060 A1   6/2016
(Continued)

*Primary Examiner* — Matthew T Largi
(74) *Attorney, Agent, or Firm* — Vincent Mastrogiacomo; McCoy Russell LLP

(57) ABSTRACT

Methods and systems are provided for a vehicle. In one example, a method may include acquiring measurements from at least one exhaust emission sensor of the vehicle, the exhaust emission sensor positioned to measure one of $NO_x$, $NH_3$, and $O_2$ levels in exhaust gas of the vehicle. The measurements may be input into a machine learning model trained to output a predicted real-time amount of at least one exhaust gas constituent in the exhaust gas and operations of an emissions aftertreatment system may be assessed and adjusted based on the predicted real-time amount of the at least one exhaust gas constituent.

18 Claims, 5 Drawing Sheets

(56) References Cited

U.S. PATENT DOCUMENTS

| | | | | |
|---|---|---|---|---|
| 2007/0265763 | A1* | 11/2007 | Akazaki | F02D 41/1458 |
| | | | | 701/111 |
| 2008/0201054 | A1* | 8/2008 | Grichnik | F02D 41/1401 |
| | | | | 703/2 |
| 2009/0300422 | A1* | 12/2009 | Grichnik | G05B 23/024 |
| | | | | 714/E11.178 |
| 2013/0245919 | A1* | 9/2013 | Kumar | F02D 41/0295 |
| | | | | 701/104 |
| 2015/0010449 | A1* | 1/2015 | Devarakonda | F01N 3/108 |
| | | | | 422/108 |
| 2015/0082773 | A1* | 3/2015 | Devarakonda | F02D 41/1454 |
| | | | | 436/37 |
| 2019/0311262 | A1* | 10/2019 | Nagasaka | F01N 9/00 |
| 2020/0032731 | A1* | 1/2020 | Milanese | F01N 11/007 |
| 2020/0063633 | A1 | 2/2020 | Lauritano et al. | |
| 2020/0108815 | A1* | 4/2020 | Nakamura | F02D 41/403 |
| 2020/0233427 | A1* | 7/2020 | Fukuoka | G06V 30/194 |

FOREIGN PATENT DOCUMENTS

| | | |
|---|---|---|
| EP | 1544431 A1 | 6/2005 |
| JP | 5386552 B2 | 1/2014 |
| WO | 2007082426 A1 | 7/2007 |

\* cited by examiner

SYSTEM AND METHODS FOR ESTIMATING EMISSIONS

FIELD

The present description relates generally to methods and systems for inferring a mass of an exhaust gas constituent emitted by a vehicle.

BACKGROUND/SUMMARY

Carbon monoxide (CO) is a byproduct gas of a combustion engine targeted for regulation and requires the use of emissions aftertreatment systems. Such regulations may demand, subsequent to vehicle manufacture and assembly and before the vehicle is made commercially available, a mass of CO emitted by the vehicle, as well as other exhaust gas constituents, during a drive cycle to be measured and maintained below a threshold value, with typical units of mass/distance. For example, the CO measurement may be conducted in a laboratory on a chassis dynamometer. However, a desire to monitor emissions composition under real world conditions has motivated the development of portable emissions measurement systems (PEMS) and mini-PEMS capable of quantifying emissions composition during on-road vehicle operation. Although the PEMS may supply useful information during on-road conditions, implementation of the PEMS may incur high costs while their operation may demand a high degree of technical expertise, making them impractical for fleet-scale CO emissions monitoring. Instead, a low-cost system demanding minimal oversight for determining CO mass during drive cycles is desirable.

Attempts to address simple cost-effective methods for measuring CO emissions include inferring the CO emission mass based on different measured parameters of the vehicle. One example approach is shown by Weymann in German Patent No. 102008057494. Therein, emissions from an internal combustion engine are predicted using a model generated by an artificial neural network. The model may use a combustion chamber pressure curve and/or an engine heating course as inputs and the outputs may be proportional engine emission values of CO, $CO_2$, and $NO_x$.

However, the inventors herein have recognized potential issues with such systems. As one example, the above model may predict engine out emissions without incorporating a subsequent effect of the aftertreatment system on said emissions. The estimations are therefore not representative of a true concentration of emissions released from a vehicle and may not be useful for understanding impacts of combustion engines on air quality or for diagnosing aftertreatment system health.

In one example, the issues described above may be addressed by a method for a vehicle including acquiring measurements from at least one exhaust emission sensor of the vehicle, the exhaust emission sensor positioned to measure one or more of $NO_x$, $NH_3$, and $O_2$ concentration in the exhaust gas of the vehicle, and inputting the measurements from at least one exhaust emission sensor into a machine learning model trained to output a predicted real-time concentration of at least one gas constituent in the exhaust gas. Performance of an emissions aftertreatment system may be assessed and adjusted based on the predicted real-time concentration of the at least one exhaust gas constituent. In this way, the emissions may be estimated at any point during vehicle operation using emission sensors that are typically installed in a vehicle. For example, the at least one exhaust gas constituent may include CO and the machine learning model may infer a mass of CO emitted or a concentration of CO in the exhaust gas. The estimated CO emissions may be used to reduce CO emission through a control scheme, to report the CO emission mass to meet emissions regulations, and for vehicle diagnostics, such as the status of an emissions aftertreatment system.

As one example, the machine learning model may be trained under on-road conditions by simultaneously acquiring measurements from vehicle emission sensors, vehicle ECU parameters, and a PEMS configured to measure tailpipe CO emissions. In this way, after the machine learning model is trained and developed, CO emissions may be inferred during on-road (i.e., real-world) driving without relying on additional emissions sensors, or skilled technicians to facilitate measurement of the CO emissions. The CO emissions may be monitored at fleet-scale and information regarding CO emissions may be gathered wirelessly from vehicles. Trends in CO emissions for a fleet of vehicles may be collected and analyzed to inform warranty information regarding the performance of the emissions aftertreatment system over time. Additionally, trends in CO emissions may be provided to regulators or used in a feedback loop for an aftertreatment system or for engine control.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
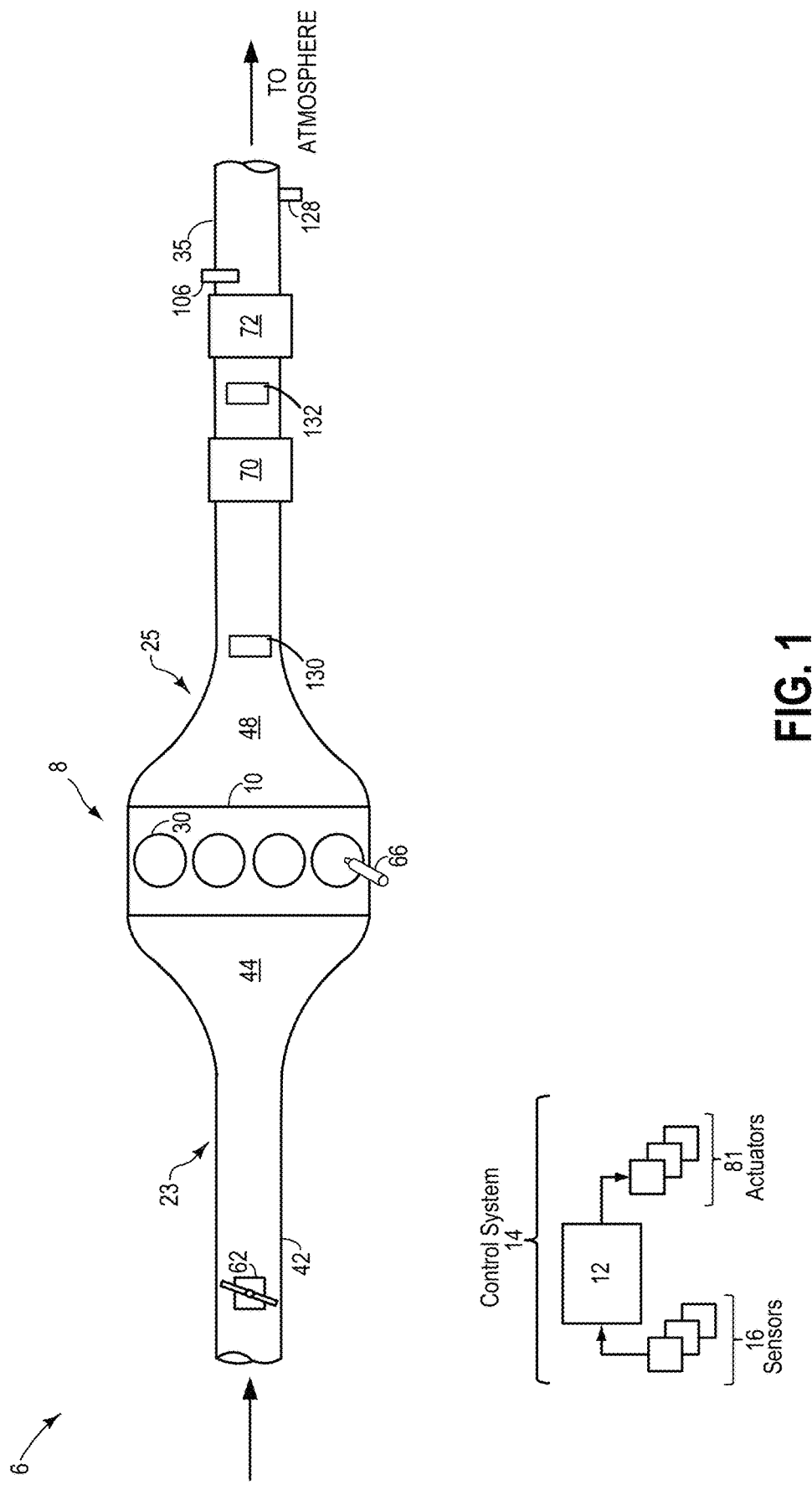
FIG. 1 shows a schematic diagram of a vehicle system with an exhaust aftertreatment system, according to an embodiment of the disclosure.

The following description relates to a system and method for using a machine learning model to predict a real-time amount of CO in exhaust gas for a vehicle, such as the vehicle system of FIG. 1. Herein, "amount" may be defined as a concentration or a mass. While determining CO amounts in exhaust gas is described herein as a use-case example, the machine learning model may be used to predict amounts of other exhaust gas constituents, including hydrocarbons and other byproducts of hydrocarbon combustion. The real-time prediction of emissions, as described herein, may be particularly beneficial for estimation of CO emissions, however, due to a relationship between CO and the stoichiometry of the exhaust gas.

Figure 2:
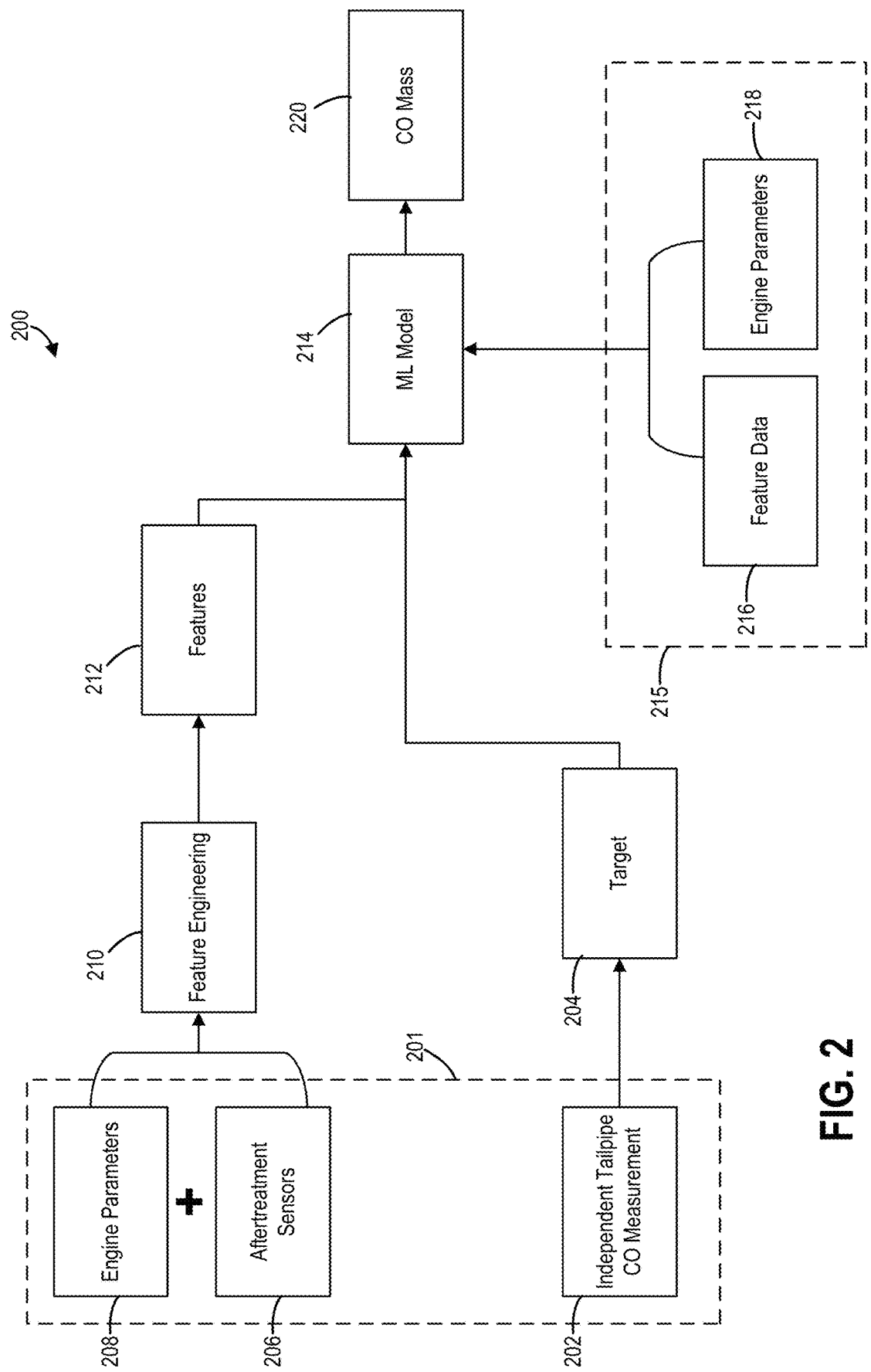
FIG. 2 shows a block diagram of a strategy for inferring exhaust gas CO emissions using a machine learning model and output from sensors of the exhaust aftertreatment system of FIG. 1.
Figure 4:
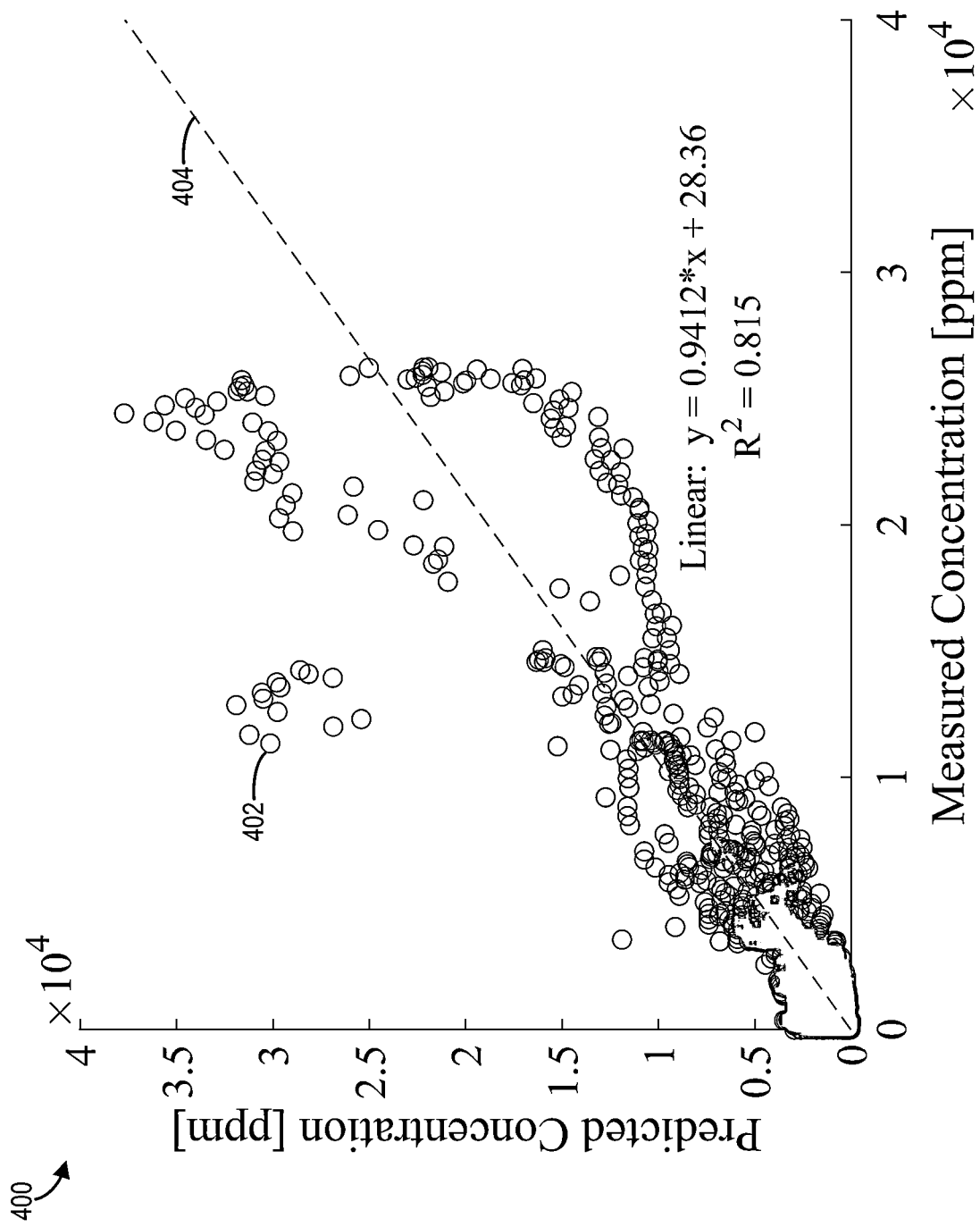
FIG. 4 shows a parity plot of CO concentrations predicted using a machine learning model relative to measured CO concentrations during a drive cycle.
Figure 5:
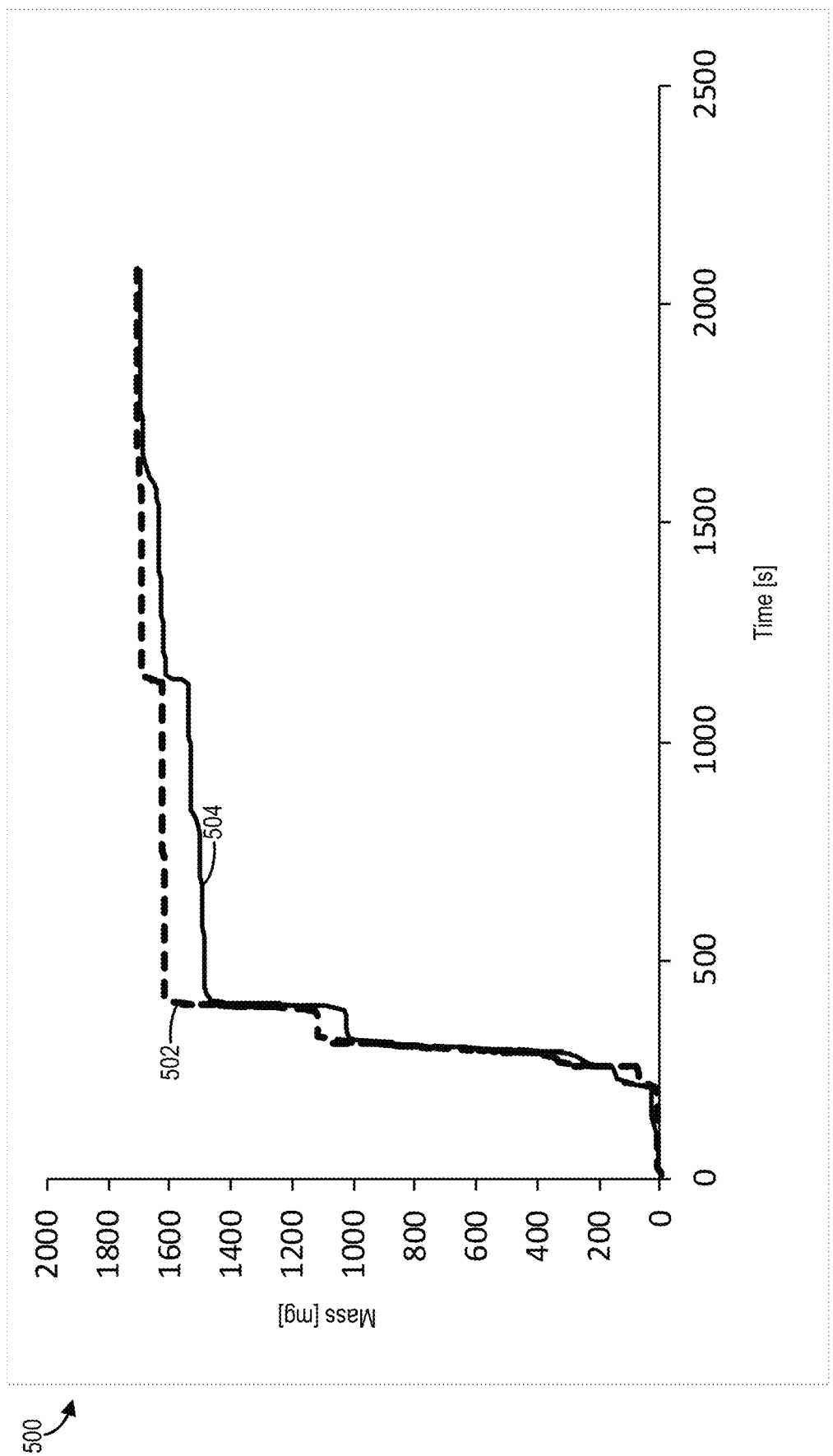
FIG. 5 shows a graph of CO emissions relative to time plotting measurements from a portable emission measurement system (PEMS) and as predicted by a machine learning model during a drive cycle.

The machine learning model may be trained based on features and a target as described in FIG. 2 by a block diagram showing a process for training and utilizing the machine learning model. For example, the target used by the machine learning model may be a measured exhaust gas CO concentration or CO mass and the features may include a linear $O_2$ signal from a nitrogen oxide ($NO_x$) sensor, a signal from a heated exhaust gas oxygen (HEGO) sensor, a signal from a universal exhaust gas oxygen (UEGO) sensor, and signals from real or virtual sensors monitoring various engine operating parameters. The machine learning model may be implemented at a controller of the vehicle system following an example method shown in FIG. 3. Accuracy of the trained machine learning model may be evaluated by collecting both feature data and target data during drive cycles. A measured exhaust gas CO concentration and a corresponding predicted exhaust gas CO concentration may be compared in a parity plot, as shown in FIG. 4. Additionally, time traces of a measured and predicted CO mass output may be compared, as shown in FIG. 5.

FIG. 1 shows a schematic depiction of a vehicle system 6. The vehicle system 6 includes an engine system 8. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as a turbocharger (not shown), and upstream of an after-cooler (not shown). When included, the after-cooler may be configured to reduce the temperature of intake air compressed by the boosting device.

Engine exhaust 25 may include one or more emission control devices 70, which may be mounted in a close-coupled position along the exhaust passage 35 and included in an emissions aftertreatment system of the vehicle system 6. The one or more emission control devices may include a three-way catalyst, lean $NO_x$ filter, SCR catalyst, etc. A second emission control device 72 may be positioned further from the engine (e.g., under the body of the vehicle). For example, the second emission control device 72 may be an under-body catalyst. The one or more emission control devices 70 may rapidly reach a light-off temperature due to a proximity to engine 10, but may have a smaller loading capacity than the second emission control device 72. The second emission control device 72 may reach a light-off temperature after one or more emission control devices 70 and may further treat emissions downstream from the one or more emission control devices 70. Various exhaust sensors may be positioned in the exhaust passage 35, upstream and/or downstream of the emission control devices and together, the exhaust sensors and emission control device may form an emissions aftertreatment system of the vehicle system 6.

The vehicle system 6 may further include control system 14. Control system 14 is shown receiving information from a plurality of sensors 16 (various examples of which are described herein) and sending control signals to a plurality of actuators 81 (various examples of which are described herein). As one example, the plurality of sensors 16 may be a first exhaust gas sensor 130 (located in exhaust manifold 48) configured to infer an engine air/fuel ratio (for example, a UEGO sensor), a second exhaust gas sensor 132 (for example, a HEGO sensor) located in the exhaust passage 35 between emission control devices 70 and 72, a temperature sensor 128, and a $NO_x$ sensor 106 (located downstream of emission control device 72). The exhaust gas sensors 130 and 132 may measure an amount of oxidized or reduced species (e.g., oxygen, $NO_x$, hydrocarbons, $NH_3$, etc.) in the exhaust to indicate an air-to-fuel ratio (AFR) at engine 10. When the first exhaust gas sensor 130 is implemented as the UEGO sensor, the UEGO sensor may output a signal, which may be proportional to the ratio of the AFR to a stoichiometric AFR (i.e., lambda). When the second exhaust gas sensor 132 is implemented as the HEGO sensor, the HEGO sensor may output a binary $O_2$ signal that indicates whether exhaust gas is rich or lean. $NO_x$ sensor 106 may output three different data sets: a first data set proportional to the sum of both $NO_x$ and ammonia ($NH_3$) concentrations, a second data set including a binary $O_2$ signal, and a third data set including a linear $O_2$ signal that is proportional to the concentration of oxygen that must be pumped into or out of the exhaust to reach a stoichiometric condition.

Other sensors, such as additional pressure, temperature, air/fuel ratio, exhaust flow rate and composition sensors, may be coupled to various locations in the vehicle system 6. As another example, the actuators may include fuel injectors 66, throttle 62, switches of electric circuits, etc. The control system 14 may include a controller 12. The controller 12 may be configured with computer readable instructions stored on non-transitory memory. The controller 12 receives signals from the plurality of sensors 16, processes the signals, and employs the plurality of actuators 81 to adjust engine operation based on the received signals and instructions stored on the memory of the controller 12. For example, the controller 12 may acquire data regarding various engine operating parameters from a primary engine control module stored in the controller's memory and estimate an exhaust flow rate from the data. Processing the received signals may also include implementing a machine learning method for inferring CO emissions based on features including: the output signal of $NO_x$ sensor 106 and other sensors such as exhaust gas sensors 130 and 132. For example, controller 12 may determine that CO emissions, based on a predicted, real-time CO concentration of the exhaust gas estimated by the machine learning model from the sensor outputs, are above a threshold (e.g., 600 mg/km) and turn on a malfunction indicator light (MIL) to indicate to a user that the vehicle emissions exceeded the threshold. Additionally or alternatively, the MIL may indicate potential degradation of the aftertreatment system.

CO emissions of a vehicle may be measured in real-time during a drive cycle using a PEMS. Due to cost of the PEMS as well as expertise to properly operate the PEMS, configuring the vehicle with the PEMS is undesirable. As a result, the CO emissions of a vehicle may only be measured under controlled, test conditions prior to vehicle sale. However, it may be desirable to continuously monitor the CO emissions of a vehicle to better adjust engine aftertreatment control systems in order to minimize CO emissions and to inform the vehicle operator as to the health of the vehicle aftertreatment system. A process for inferring CO concentration, such as a process described in FIG. 2 based on outputs of sensors currently installed in the vehicle may allow for more rigorous control of CO emissions from an engine. The process may include training a machine learning model based on training data obtained from various vehicle operating parameters (e.g., emission sensors, powertrain control module [PCM] parameters, etc.) and from CO measurements, the training data acquired from exhaust gas emitted by a training vehicle. For example, the training vehicle may be a vehicle exhaust simulation system or a laboratory vehicle operated in a testing facility across a plurality of drive cycles and drive conditions.

In one example, implementation of the process depicted in FIG. 2 may result in automatic prediction of a real-time CO concentration or mass of vehicle emissions. Furthermore, engine or aftertreatment operating parameters may be automatically adjusted, e.g., without user input, in response to the predicted real-time CO concentration to reduce CO emissions. Additionally, the predicted real-time CO concentration may be updated at a high frequency, such as 1 Hz-100 Hz, thereby minimizing increases in CO emissions due to a lag between real-time variations in engine or aftertreatment system operating conditions and corresponding CO concentration determination.

Turning now to FIG. 2, it shows a block diagram of a process 200 for inferring exhaust gas CO concentration and exhaust gas CO mass for a vehicle system (e.g., the vehicle system 6 of FIG. 1) using a machine learning model 214. As described above, the process 200 may be similarly used to infer concentration and mass of other exhaust gas constituents, such as hydrocarbons. Machine learning model 214 may receive a first set of inputs and a second set of inputs. The first set of inputs may include features 212 and target 204 used as described below to train machine learning model 214. The second set of inputs may include on-road drive data 215 used by machine learning model 214 to infer an exhaust gas CO concentration and exhaust gas CO mass. Machine learning model 214 may be trained, using acquired training data 201, and utilized to estimate CO emissions based on the target 204, which may be a concentration or a mass. Machine learning model 214 may be a regression model utilizing linear regression, polynomial regression, a neural network, a decision-tree based model, a Bayesian network, etc.

The target 204 may be the CO concentration of the exhaust gas at any given time. The target 204 may be obtained from independent tailpipe CO measurements 202. Independent tailpipe CO measurements may be acquired by an independent CO measurement system such as a PEMS or mini-PEMS coupled to a tailpipe of the vehicle system from which CO measurements may be recorded during a driving event. The PEMS or mini-PEMS may include a non-disperse infrared (NDIR) detector capable of quantifying an amount of CO in a gas volume. CO concentrations may be measured over a range of on-road driving conditions. The independent tailpipe CO measurements 202 may be recorded as a function of time, creating a time trace of values for the target 204. The time trace of values for the target 204 may be used to train machine learning model 214. A separate time trace of values may be collected in the same manner and used for validating and testing machine learning model 214, as discussed below.

As one example, the linear $O_2$ signal output by the $NO_x$ sensor may be proportional to relative concentrations of CO, $H_2$, $NH_3$, and HC in the exhaust gas under rich conditions, the rich conditions determined based on a binary $O_2$ signal output by the $NO_x$ sensor and/or a signal from a HEGO. Under rich conditions, the $NO_x$ sensor may generate a signal proportional to the concentration of a sum of $NO_x$ and $NH_3$ in the exhaust gas, which may (but not necessarily) represent predominantly $NH_3$ during rich exhaust gas conditions. As well, the machine learning model may estimate a value proportional to a ratio of CO to $H_2$ in the exhaust gas under rich conditions if the concentration of $(HC+NH_3) \ll (CO+ H_2)$. Under lean exhaust gas conditions, CO is oxidized efficiently to $CO_2$ and may be present in substantially lower concentrations.

Data may be gathered from aftertreatment sensors 206 and engine parameters 208 while independent tailpipe CO measurements 202 are obtained during a variety of drive cycles, including under rich conditions. Aftertreatment sensors 206 may include the sensors described above with respect to FIG. 1 including but not limited to: the $NO_x$ sensor, a UEGO sensor, and a HEGO sensor. Signals from the $NO_x$ sensor may include a linear $O_2$ signal, a binary $O_2$ signal, and the summed concentration of $NH_3$ and $NO_x$, as discussed above. Additionally, or alternatively aftertreatment sensors 206 may include a HEGO sensor or other aftertreatment sensors in place of the $NO_x$ sensor. Said another way, the $NO_x$ sensor may not be required as one of aftertreatment sensors 206. Engine parameters 208 may include parameters measured by various engine sensors, such as engine temperature, engine rpm, air mass charge, fuel mass, engine load, etc. Outputs from engine parameters 208, and aftertreatment sensors 206 may be collected over a duration of time to create feature time traces before undergoing feature engineering 210.

Measurements from engine parameters 208 and aftertreatment sensors 206 may be combined and adjusted using feature engineering 210. Feature engineering 210 may include weighting the data points in the model toward more accurate prediction of high mass-emission events. Additionally or alternatively, feature engineering 210 may include adding a flag for deceleration fuel shutoff events, applying a simple catalyst oxygen storage model, using time-lagged features, etc. As a result of feature engineering 210, features 212 and the feature time trace may be generated. The features 212 and the target 204 may be generated over a common time period and may be used to train the machine learning model 214 by aligning the features time trace with the target time trace with respect to time. For example, variations in the features 212, e.g., measurements used to generate the features time trace, and variations in the target 204, e.g., measurements used to generate the target time trace, may be correlated over a common duration of time. Training machine learning model 214 may include generating the various coefficients, weights, nodes, hyperparameters, etc., used to define the machine learning model and thereby to infer the CO concentration.

As an example, machine learning model 214 may be trained using a neural network. In order to train machine learning model 214, training data may be transmitted to the neural network. The training data may include, for example, both input data (i.e., model features) and ground truth data where the input data includes measurements from various emission sensor and PCM parameters, used to generate the feature time traces, and the ground truth data includes measurements of CO from the PEMS, used to generate the target time trace. The $NO_x$ sensor and the PEMS may collect measurements from a training vehicle which may be operated over a variety of drive cycles, either on a chassis dynamometer or on road, including various engine operating conditions. The generated features time trace may be time-aligned with the target time trace and the machine learning model may be updated based on a loss function calculated between an output, e.g., a predicted real-time CO concentration, and the ground truth to increase an accuracy of the machine learning model.

Once trained, machine learning model 214 may be implemented at a controller, such as controller 12 of FIG. 1. Machine learning model 214 may be configured to receive on-road drive data 215. On-road drive data 215 may include feature data 216 and engine parameters 218. Feature data 216 may be real-time data which may correspond to features 212. As such, feature data 216 may be collected from aftertreatment sensors and engine parameters, combined and subjected to feature engineering. Furthermore, feature data 216 does not include independent tailpipe CO measurements 202. Engine parameters 218 may include an exhaust flow rate, which may be a virtual feature calculated from engine parameters (such as a flow rate calculated from various parameters in the engine primary control module). Feature data 216 and engine parameters 218 may be collected as synchronous time traces. The synchronous time traces may act as inputs to machine learning model 214 (previously trained using features 212 and target 204 as described above) for inferring a target trace of CO mass 220 generated over time. The target trace of CO mass 220 generated may be further used to inform the operation of a vehicle such as vehicle 6 of FIG. 1 as described below with respect to FIG. 3.

Figure 3:
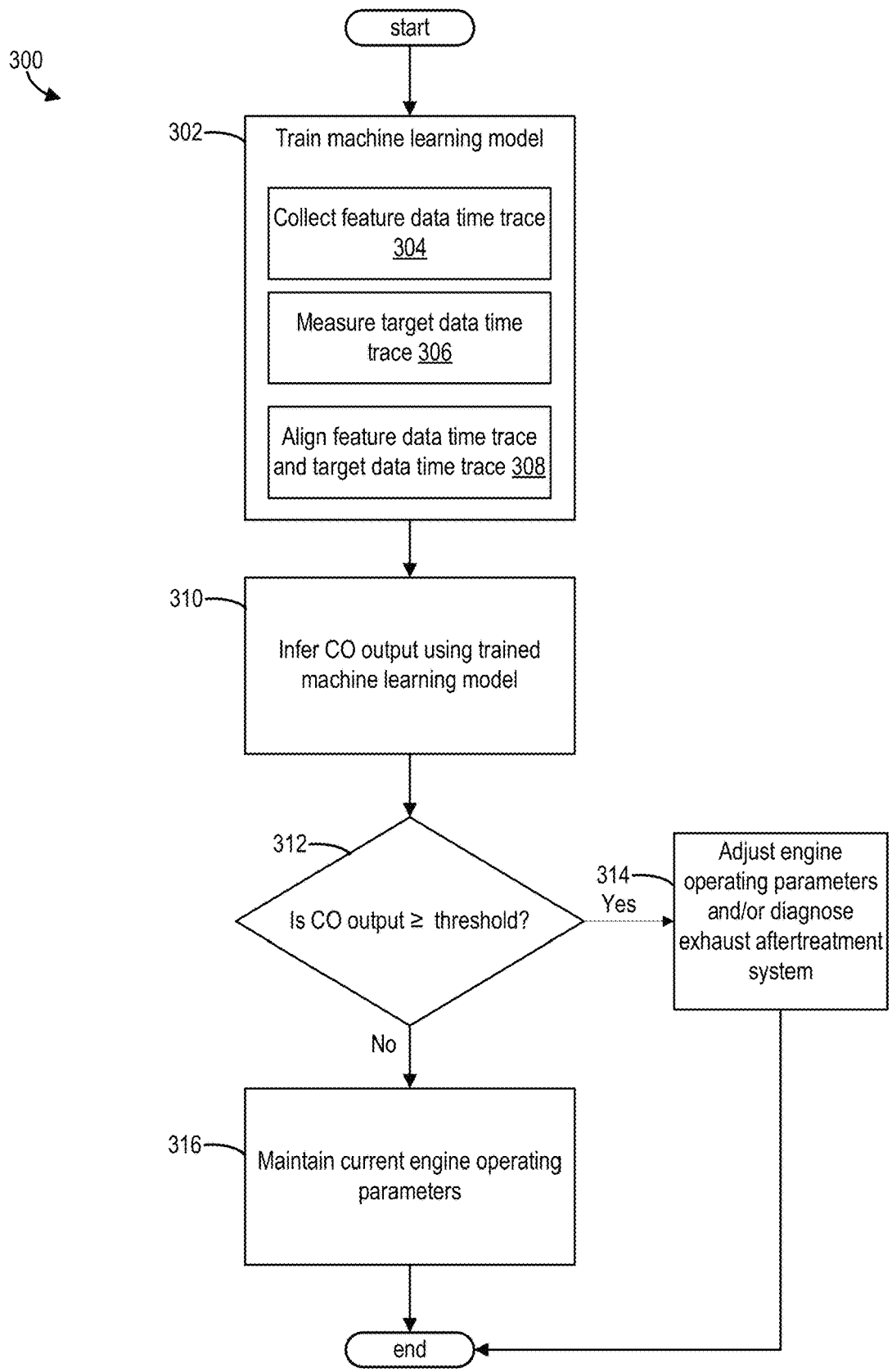
FIG. 3 shows a flow chart of an example of a method for using a machine learning model for inferring an amount of exhaust gas CO emission.

FIG. 3 shows a method 300 for adjusting engine operations based on CO emissions predicted in real-time by a machine learning model implemented at a controller (e.g., controller 12 of FIG. 1). Instructions for carrying out method 300 may be executed by the controller based on instructions stored in controller memory and in conjunction with signals received from sensors of the engine system, such as a $NO_x$ sensor, UEGO sensor, HEGO sensor, and other engine parameter sensors as described above with reference to FIG. 1. The controller may employ engine actuators of the engine system to adjust engine operation, according to the method described below. Engine operations may be executed in a vehicle system such as vehicle 6 of FIG. 1.

At 302, method 300 includes training the machine learning model. The machine learning model may be similar to machine learning model 214 of FIG. 2. Training the machine learning model includes collecting a training data set. The training data set may include a first training data set and a second training data set. The first training data set includes a feature data time trace at 304. Feature data may include data related to features such as, a linear $O_2$ signal from an $NO_x$ sensor, signals from a UEGO and/or HEGO sensor, and other engine parameters, and may be engineered as discussed above, with respect to FIG. 2. The second training data set includes measuring a target data time trace at 306. The target data time trace may be generated by a measurement device independent of the vehicle sensors, such as a PEMS or mini-PEMS. Training the machine learning further includes aligning the feature data time trace and target data time trace at 308.

At 310, method 300 includes inferring a CO output using the trained machine learning model. The CO output may be inferred by inputting feature data and engine parameters as described above with respect to on-road drive data 215 of FIG. 2. For example, feature data may include a combination of outputs from an $NO_x$ sensor, a HEGO sensor, and a UEGO sensor and the engine parameters may include engine RPM, air mass charge, fuel mass, and engine load, etc. The CO output inferred by the trained machine learning model may be a concentration of CO in exhaust gas. If the engine parameters include an exhaust gas flow rate, the mass of CO output over a discrete time period may be inferred. In some examples, however, the target data time trace may be generated based on a total mass of CO emitted over time thereby precluding integration of the CO concentration relative to the measured exhaust gas flow rate.

At 312, the CO output is compared to a threshold value. For example, the threshold may be 600 mg/km. If the CO output is greater than or equal to the threshold, engine and/or aftertreatment system operating parameters may be adjusted at 314. For example, the predicted CO output may be used to assess a condition of one or more emission control devices, such as the emission control devices 70 and 72 of FIG. 1, of an exhaust aftertreatment system of the engine. For example, if engine operation parameters are adjusted to decrease CO emissions but the predicted CO output does not decrease in response to the adjustments, a component of an exhaust aftertreatment of the vehicle system may be degraded. In some examples, if the component of the exhaust aftertreatment is deemed degraded, a notification may be indicated to an operator, such as a service alert. For example, a CO output above the threshold may indicate one or more of the catalysts of the emissions control devices may be degraded. In another example, CO output may be communicated wirelessly to a central hub (e.g., a database on a server). The central hub may then contain fleet-scale CO output over time which may be used to inform engine operating parameters in future fleets or an expected lifetime of an emissions aftertreatment system. If the CO output is less than the threshold, current engine operating parameters are maintained at 316.

To validate a machine learning model such as machine learning model 214, testing data may be collected. Testing data may include a set of target data inferred using the machine learning model collected synchronously with a set of target data collected using an independent measurement system. Testing data may then be used to validate (or determine accuracy of) machine learning model 214 as described below with respect to FIGS. 4-5.

Turning now to FIG. 4, the accuracy of machine learning model 214 may be demonstrated by parity plot 400. Parity plot 400 plots predicted exhaust gas CO concentration in ppm as a function of measured exhaust gas CO concentration, also in ppm. Predicted (e.g., inferred) concentration is output by a machine learning model, according to the process 200 of FIG. 2, for a test vehicle. Measured concentration may be generated by a PEMS or mini-PEMS coupled to the tailpipe of the test vehicle. Data points 402 are collected over three different driving events for a total driving time of 150 minutes. Data points 402 may be best fit by linear trend line 404 which shows a correlation between the predicted CO concentration and measured CO concentration of $R^2 > 0.8$ with a slope of near unity (0.9>slope>1.1). Variance between the predicted values and measured values may be due to inherently different time resolutions of the target time traces generated by the PEMS (measured values) and of the features time trace generated by the $NO_x$ sensor used as the primary input to the machine learning model.

In addition to inferring concentration of CO in vehicle emissions, the output of the machine learning model may be used to calculate a mass of CO emitted over time when combined with other engine parameters such as exhaust flow rate, as described above with respect to FIG. 2. Graph 500 of FIG. 5 shows mass of CO (in mg) relative to a duration of a driving cycle. The duration of the driving cycle may correspond to one of the driving events providing data for parity plot 400 of FIG. 4. Trace 502 represents values measured by a PEMS as discussed with respect to FIG. 3 above. Trace 504 represents values predicted for the same drive cycle using the machine learning model. The CO mass as a function of time may be calculated by inputting features combined with exhaust flow rate information to the machine learning model. Graph 500 shows trace 502 is substantially similar to trace 504. Over three different drives (two additional drives not shown) the machine learning model 214 inferred CO mass differed from the PEMS measured mass by only 14%, confirming the machine learning model 214 and other engine parameters may be used to infer a mass of CO emissions over time.

In this way, a machine learning model inferring exhaust gas CO concentration may be trained and tested. An exhaust gas CO concentration may be inferred during on-road driving conditions using only sensors typically installed in a vehicle such as a $NO_x$ sensor, HEGO, UEGO, and engine parameters as inputs for the machine learning model. The exhaust gas CO concentration may be inferred by a trained machine learning model programmed on a controller and may be processed by the controller without requiring expert oversight. Additionally or alternatively, exhaust gas CO mass may be calculated from exhaust gas CO concentration and exhaust gas flow rate. As a result, CO emissions may be maintained low without incorporating additional, costly sensors, such as a sensor for direct CO measurement, thereby increasing an efficiency of the vehicle.

The technical effect of inferring exhaust gas CO mass by using a machine learning model is that real-time CO concentration emitted by a vehicle may be automatically predicted by the machine learning model and engine operation may be automatically adjusted in response to the prediction to reduce CO emissions. For example, an increase in exhaust gas CO may indicate a shift to a rich AFR and air intake and/or fuel injection may be adjusted in response.

The disclosure also provides support for a method for a vehicle, comprising: acquiring measurements from at least one exhaust emission sensor of the vehicle, the at least one exhaust emission sensor positioned to measure one or more of $NO_x$, NH3, and O2 levels in exhaust gas of the vehicle, inputting the measurements from the at least one exhaust emission sensor into a machine learning model trained to output a predicted real-time amount of at least one exhaust gas constituent, the at least one exhaust gas constituent including CO and/or hydrocarbons, and adjusting and assessing operations of an emissions aftertreatment system based on the predicted real-time amount of the at least one exhaust gas constituent. In a first example of the method, the machine learning model is trained with training data, the training data including a plurality of training measurements from the at least one exhaust emission sensor and a plurality of corresponding training measurements of the at least one exhaust gas constituent, and wherein the plurality of training measurements from the at least one exhaust emission sensor include a signal representing a sum of $NO_x$ and NH3 concentrations and/or oxygen concentration in the exhaust gas. In a second example of the method, optionally including the first example, the training data is collected from exhaust gas of one or more training vehicles operated at rich, lean and stoichiometric combustion conditions. In a third example of the method, optionally including one or both of the first and second examples, adjusting the operations of the emissions aftertreatment system based on the predicted real-time amount of the at least one exhaust gas constituent includes adjusting the operations without relying on a sensor measuring an actual amount of the at least one exhaust gas constituent of the exhaust gas. In a fourth example of the method, optionally including one or more or each of the first through third examples, acquiring the measurements from the at least one exhaust emission sensor includes obtaining a signal representing an ammonia concentration in the exhaust gas and subtracting the signal representing the ammonia concentration from a total linear oxygen signal of the at least one exhaust emission sensor, and wherein subtracting the signal representing the ammonia concentration from the total linear oxygen signal includes generating a first value representing a first sum of a CO concentration, a hydrogen concentration, and a hydrocarbon concentration in the exhaust gas. In a fifth example of the method, optionally including one or more or each of the first through fourth examples, the method further comprises: inputting measurements from sensors monitoring engine operating parameters of the vehicle to the machine learning model in addition to the measurements from the at least one exhaust emission sensor to output the predicted real-time CO concentration, and wherein the at least one exhaust emission sensor includes one or more of a UEGO sensor, a HEGO sensor, and a $NO_x$ sensor. In a sixth example of the method, optionally including one or more or each of the first through fifth examples, the method further comprises: applying one or more of coefficients, weights, nodes, and hyperparameters, via the machine learning model, to the measurements input from the at least one exhaust emission sensor to output the predicted real-time amount of the at least one exhaust gas constituent. In a seventh example of the method, optionally including one or more or each of the first through sixth examples, training of the machine learning model includes generating a features time trace based on the plurality of training measurements from the at least one exhaust emission sensor, training measurements from additional exhaust emission sensors, and training measurements from sensors monitoring engine operating parameters of a training vehicle, and generating a target time trace based on the plurality of training measurements of the at least one exhaust gas constituent, and wherein the features time trace and the target time trace are acquired over a common duration of time. In an eighth example of the method, optionally including one or more or each of the first through seventh examples, the training of the machine learning model includes aligning the features time trace with the target time trace over the common duration of time and correlating variations in the plurality of training measurements of the at least one exhaust gas constituent from the target time trace to variations in the plurality of training measurements from the at least one exhaust emission sensor, the additional exhaust emission sensors, and the sensors monitoring the engine operating parameters of the training vehicle. In a ninth example of the method, optionally including one or more or each of the first through eighth examples, assessing the operations of the emissions aftertreatment system includes diagnosing a condition of the emissions aftertreatment system and activating a malfunction indicator light if the emissions aftertreatment system is deemed degraded. In a tenth example of the method, optionally including one or more or each of the first through ninth examples, the method further comprises: using the machine learning model to predict emissions of the at least one exhaust gas constituent in real-time across a fleet of vehicles, and wherein using the machine learning model across the fleet of vehicles includes communicatively linking the fleet of vehicles to monitor fleet-scale emissions of the at least one exhaust gas constituent.

The disclosure also provides support for an exhaust aftertreatment system of an engine, comprising: an exhaust tailpipe, one or more exhaust aftertreatment devices arranged along the exhaust tailpipe, one or more exhaust sensors positioned in the exhaust tailpipe, the one or more exhaust sensors including a $NO_x$ sensor, and a controller, configured with executable instructions stored in non-transitory memory that, when executed, cause the controller to:

acquire measurements from the NO$_x$ sensor, input the measurements into a machine learning model trained to output a predicted real-time concentration of an exhaust gas constituent in exhaust gas, and adjust one or more engine operating parameters based on the predicted real-time concentration of the exhaust gas constituent to maintain an actual exhaust gas constituent concentration of the exhaust gas below a threshold concentration. In a first example of the system, the system further comprises: executable instructions stored in the non-transitory memory of the controller that, when executed, cause the controller to: acquire measurements from one or more engine sensors configured to monitor engine operating parameters and from the one or more exhaust sensors to validate a training of the machine learning model. In a second example of the system, optionally including the first example, the one or more engine operating parameters include one or more of engine temperature, engine rpm, air mass charge, fuel mass, and engine load. In a third example of the system, optionally including one or both of the first and second examples, the measurements from the NO$_x$ sensor includes a first data set corresponding to a sum of concentrations of NO$_x$ and NH3, a second data set corresponding to a binary O2 signal, and a third data set corresponding to a linear O2 signal, and wherein the second data set is correlated to a signal from a HEGO sensor of the one or more exhaust sensors and the third data set is correlated to a signal from a UEGO sensor of the one or more exhaust sensors. In a fourth example of the system, optionally including one or more or each of the first through third examples, the exhaust gas constituent is one or more of CO and hydrocarbons.

The disclosure also provides support for a method for predicting emissions in real-time, comprising: obtaining measurements from one or more exhaust sensors, the one or more exhaust sensors including a UEGO sensor, a HEGO sensor, and a NO$_x$ sensor, applying one or more of coefficients, weights, nodes, and hyperparameters to the measurements to determine a value proportional to a sum of a concentration of at least one exhaust gas constituent and hydrogen concentration in exhaust gas by entering the measurements into a machine learning model trained to generate predicted real-time emissions of the at least one exhaust gas constituent, and adjusting engine operation based on the predicted real-time emissions of the at least one exhaust gas constituent to maintain an actual concentration of the at least one exhaust gas constituent in the exhaust gas below a threshold level. In a first example of the method, the method further comprises: collecting a data output from one or more engine sensors, the one or more engine sensors monitoring engine operating parameters, and entering the data output to the machine learning model to obtain the predicted real-time emissions of the at least one exhaust gas constituent. In a second example of the method, optionally including the first example, the machine learning model is trained by generating a features time trace, wherein generating the features time trace including applying feature engineering to generate the features time trace, and wherein applying the feature engineering includes one or more of normalizing data, adding time-lagged features, adding a flag for deceleration fuel shutoff events, and applying a catalyst oxygen storage model. In a third example of the method, optionally including one or both of the first and second examples, adjusting the engine operation to maintain the actual concentration of the at least one exhaust gas constituent in the exhaust gas below the threshold level includes maintaining the predicted real-time emissions of the at least one exhaust gas constituent below 600 mg/km.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
acquiring measurements from at least one exhaust emission sensor of the vehicle, the at least one exhaust emission sensor positioned to measure one or more of NO$_x$, NH$_3$, and O$_2$ levels in exhaust gas of the vehicle, wherein the acquiring includes obtaining a signal representing an ammonia concentration in the exhaust gas and subtracting the signal representing the ammonia concentration from a total linear oxygen signal of the at least one exhaust emission sensor, and wherein subtracting the signal representing the ammonia concentration from the total linear oxygen signal includes generating a first value representing a first sum of a CO concentration, a hydrogen concentration, and a hydrocarbon concentration in the exhaust gas;

inputting the measurements from the at least one exhaust emission sensor into a machine learning model trained to output a predicted real-time amount of at least one exhaust gas constituent, the at least one exhaust gas constituent including CO and/or hydrocarbons; and adjusting and assessing operations of an emissions aftertreatment system based on the predicted real-time amount of the at least one exhaust gas constituent.

2. The method of claim 1, wherein the machine learning model is trained with training data, the training data including a plurality of training measurements from the at least one exhaust emission sensor and a plurality of corresponding training measurements of the at least one exhaust gas constituent, and wherein the plurality of training measurements from the at least one exhaust emission sensor include a signal representing a sum of $NO_x$ and $NH_3$ concentrations and/or oxygen concentration in the exhaust gas.

3. The method of claim 2, wherein the training data is collected from exhaust gas of one or more training vehicles operated at rich, lean and stoichiometric combustion conditions.

4. The method of claim 2, further comprising applying one or more of coefficients, weights, nodes, and hyperparameters, via the machine learning model, to the measurements input from the at least one exhaust emission sensor to output the predicted real-time amount of the at least one exhaust gas constituent.

5. The method of claim 4, wherein training of the machine learning model includes generating a features time trace based on the plurality of training measurements from the at least one exhaust emission sensor, training measurements from additional exhaust emission sensors, and training measurements from sensors monitoring engine operating parameters of a training vehicle, and generating a target time trace based on the plurality of training measurements of the at least one exhaust gas constituent, and wherein the features time trace and the target time trace are acquired over a common duration of time.

6. The method of claim 5, wherein the training of the machine learning model includes aligning the features time trace with the target time trace over the common duration of time and correlating variations in the plurality of training measurements of the at least one exhaust gas constituent from the target time trace to variations in the plurality of training measurements from the at least one exhaust emission sensor, the additional exhaust emission sensors, and the sensors monitoring the engine operating parameters of the training vehicle.

7. The method of claim 1, wherein adjusting the operations of the emissions aftertreatment system based on the predicted real-time amount of the at least one exhaust gas constituent includes adjusting the operations without relying on a sensor measuring an actual amount of the at least one exhaust gas constituent of the exhaust gas.

8. The method of claim 1, further comprising inputting measurements from sensors monitoring engine operating parameters of the vehicle to the machine learning model in addition to the measurements from the at least one exhaust emission sensor to output the predicted real-time CO concentration, and wherein the at least one exhaust emission sensor includes one or more of a UEGO sensor, a HEGO sensor, and a $NO_x$ sensor.

9. The method of claim 1, wherein assessing the operations of the emissions aftertreatment system includes diagnosing a condition of the emissions aftertreatment system and activating a malfunction indicator light if the emissions aftertreatment system is deemed degraded.

10. The method of claim 1, further comprising using the machine learning model to predict emissions of the at least one exhaust gas constituent in real-time across a fleet of vehicles, and wherein using the machine learning model across the fleet of vehicles includes communicatively linking the fleet of vehicles to monitor fleet-scale emissions of the at least one exhaust gas constituent.

11. An exhaust aftertreatment system of an engine, comprising:
an exhaust tailpipe;
one or more exhaust aftertreatment devices arranged along the exhaust tailpipe;
one or more exhaust sensors positioned in the exhaust tailpipe, the one or more exhaust sensors including a $NO_x$ sensor; and
a controller, configured with executable instruction stored in non-transitory memory that, when executed, cause the controller to:
acquire measurements from the $NO_x$ sensor;
apply one or more of coefficients, weights, nodes, and hyperparameters to the measurements to determine a value proportional to a sum of a concentration of at least one exhaust gas constituent concentration in exhaust gas by entering the measurements into the machine learning model trained to generate predicted real-time emissions of the at least one exhaust gas constituent; and
adjust one or more engine operating parameters based on the predicted real-time concentration of the exhaust gas constituent to maintain an actual exhaust gas constituent concentration of the exhaust gas below a threshold concentration.

12. The exhaust aftertreatment system of claim 11, further comprising executable instructions stored in the non-transitory memory of the controller that, when executed, cause the controller to:
acquire measurements from one or more engine sensors configured to monitor engine operating parameters and from the one or more exhaust sensors to validate a training of the machine learning model.

13. The exhaust aftertreatment system of claim 11, wherein the one or more engine operating parameters include one or more of engine temperature, engine rpm, air mass charge, fuel mass, and engine load.

14. The exhaust aftertreatment system of claim 11, wherein the measurements from the $NO_x$ sensor includes a first data set corresponding to a sum of concentrations of $NO_x$ and $NH_3$, a second data set corresponding to a binary $O_2$ signal, and a third data set corresponding to a linear $O_2$ signal, and wherein the second data set is correlated to a signal from a HEGO sensor of the one or more exhaust sensors and the third data set is correlated to a signal from a UEGO sensor of the one or more exhaust sensors.

15. A method for predicting emissions in real-time, comprising:
obtaining measurements from one or more exhaust sensors, the one or more exhaust sensors including a UEGO sensor, a HEGO sensor, and a NOx sensor;

applying one or more of coefficients, weights, nodes, and hyperparameters to the measurements to determine a value proportional to a sum of a concentration of at least one exhaust gas constituent and hydrogen concentration in exhaust gas by entering the measurements into a machine learning model trained to generate predicted real-time emissions of the at least one exhaust gas constituent; and adjusting engine operation based on the predicted real-time emissions of the at least one exhaust gas constituent to maintain an actual concentration of the at least one exhaust gas constituent in the exhaust gas below a threshold level.

16. The method of claim 15, further comprising collecting a data output from one or more engine sensors, the one or more engine sensors monitoring engine operating parameters, and entering the data output to the machine learning model to obtain the predicted real-time emissions of the at least one exhaust gas constituent.

17. The method of claim 16, wherein the machine learning model is trained by generating a features time trace, wherein generating the features time trace including applying feature engineering to generate the features time trace, and wherein applying the feature engineering includes one or more of normalizing data, adding time-lagged features, adding a flag for deceleration fuel shutoff events, and applying a catalyst oxygen storage model.

18. The method of claim 17, wherein adjusting the engine operation to maintain the actual concentration of the at least one exhaust gas constituent in the exhaust gas below the threshold level includes maintaining the predicted real-time emissions of the at least one exhaust gas constituent below 600 mg/km.

* * * * *